Dec. 31, 1963   R. W. McNABB ETAL   3,116,245
FILTER
Filed July 23, 1958
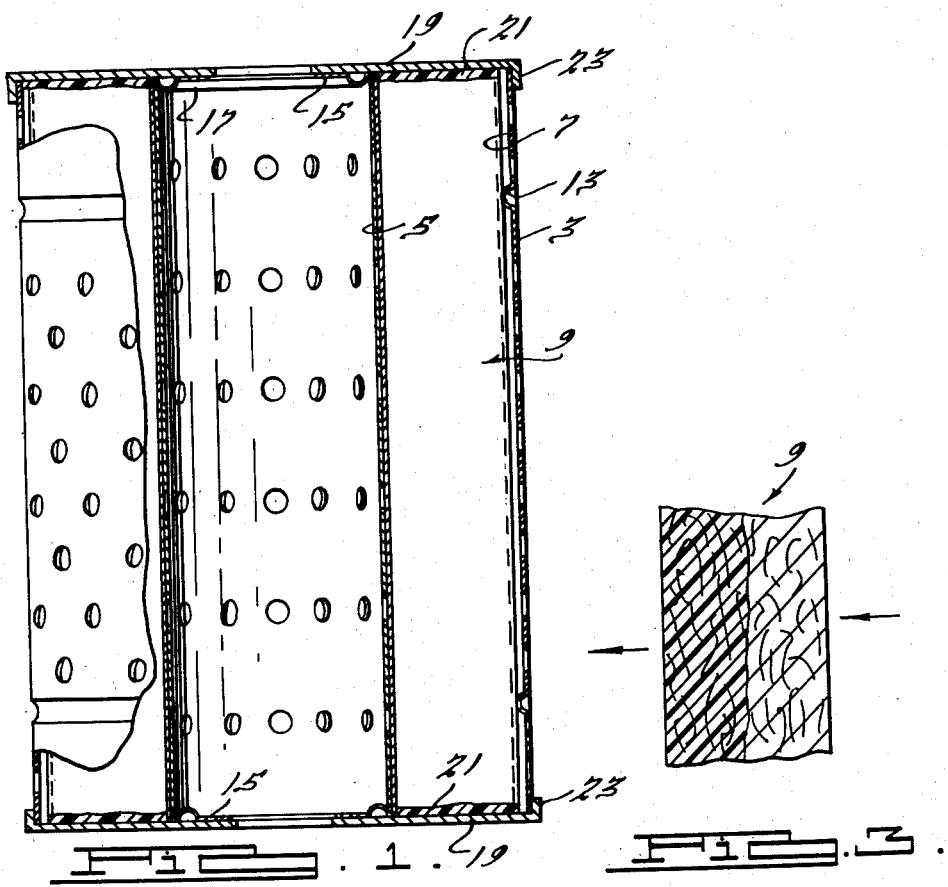
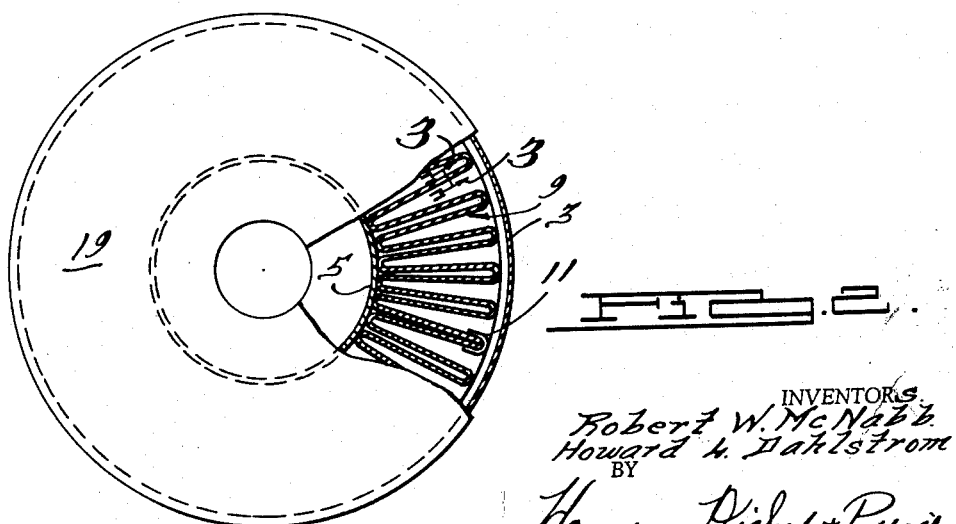
INVENTORS.
Robert W. McNabb
Howard L. Dahlstrom
BY
Harness, Dickey & Pierce
ATTORNEYS.

United States Patent Office 3,116,245
Patented Dec. 31, 1963

3,116,245
FILTER
Robert W. McNabb and Howard L. Dahlstrom, Racine, Wis., assignors, by mesne assignments, to Walker Manufacturing Company, Racine, Wis., a corporation of Delaware
Filed July 23, 1958, Ser. No. 750,351
4 Claims. (Cl. 210—508)

Our invention relates to filter media and in particular to the use of resin impregnated alpha cellulose as a medium for filtering various fluids such as lubricating oil, air, etc., and a method of making such filter media.

It is an object of this invention to provide a filter medium that removes contaminants in two ways, viz., absorption and mechanical straining.

Another object of this invention is to provide a filter medium that is particularly well adapted for use in oil filter cartridges for automobiles but which has an improved capacity for holding contaminants, strength, and life as compared with filter media now available in commercial oil filter cartridges.

Another object of the invention is to provide a filter medium of such a nature that the filter material itself resists pin hole bypassing.

A further object of the invention is to provide a filter medium which has on the fluid contact face a very absorbent, fine contamination barrier which operates at the beginning of use of the filter medium to remove contaminants from the fluid being filtered.

These and other objects of the invention will become apparent in the description to follow, and upon consideration of the accompanying drawings in which FIGURE 1 is a side elevation partly in section of a typical oil filter cartridge for automotive use containing a filter medium embodying the invention;

FIGURE 2 is an end view of the cartridge in FIGURE 1 with a portion shown in section;

FIGURE 3 is an enlarged cross section taken on the line 3—3 of FIGURE 2.

It is convenient to describe the present invention in connection with automotive type oil filter cartridges, but it is to be understood that the invention is not limited to this application and that it can be embodied in air filters and filters for various other uses.

The filter cartridge 1 of FIGURES 1 and 2 is typical of the units which can use the filter media of this invention. It comprises a perforated outer shell 3 and a perforated center tube 5. Disposed in the chamber 7 between the shell 3 and the tube 5 is the filter element or medium 9 which is a pleated annulus, the end pleats of which are held together by clips 11, adhesive, etc. Circumferential ribs embossed inwardly in the shell 3 space the outer periphery of the filter element 9 from the shell 3 and hold it against the center tube 5.

Metallic support washers 15, which have circular ribs 17, partially close the opposite ends of the center tube 5 and are held against the ends of the tube 5 by end caps 19. The end caps may be made of paper, metal, or suitable material, and the ends of the pleated filter element 9 sealed to them against bypassing by a suitable adhesive material or cement such as indicated at 21. A rim 23 on each cap 19 fits over the ends of the shell 3.

In operation of a filter of the type shown in FIGURES 1 and 2, oil enters through the perforations in the shell 3 into the annular chamber 7 and passes through the thickness of the filter element 9 which separates out contaminants. The clarified oil then flows through the perforations in the center tube 5 and thence to the areas to be lubricated.

In accordance with this invention, the filter element 9 is formed of a special material treated in a special way with the result that the material has an improved strength and filtering efficiency as compared with similar filter media that are known to the inventors. The filter material that must be used is an alpha cellulose pulp of about 98–99% purity which is made from cotton linters, such pulp being available on the open market. Cotton linters must not be confused with ordinary staple cotton fibers. They are the short fibrous material that grows on the cotton seed and which adheres to the cotton seed after ginning. The cotton linter fiber differs substantially from the staple cotton fiber in physical shape and size as well as in micro structure; and filter media embodying the principles of this invention are limited to pulp made principally from cotton linters as distinct from staple cotton fibers.

The cotton linter fiber may be generally described as a hollow cylinder. In structure it has an outer layer comprising a protective coating which is a very thin, random network of fine fibrils. Inside of the outer layer is a winding layer which serves as a wrapper to hold the inner structure of the cotton lint fiber in place. The winding layer comprises long fibrils wrapped spirally around the fiber at approximately an angle of about 30° with the longitudinal axis of the fiber. Inside of the spiral winding is a layer referred to as a transition area which is partly oriented and partly random and provides the transition from the spiral windings to the inner layer which comprises parallel laid bundles of fibrils that are oriented to extend lengthwise along the longitudinal axis of the linter fiber. Filter material from the cotton linter pulp structure has good absorbency and porosity and is more resilient than sisal, each of these characteristics being important from the standpoint of the treatment it receives in accordance with the invention as well as from the standpoint of its effectiveness as a filter medium.

It is also important that the cotton linter fibers be of the proper length and uniformity if a satisfactory filter medium is to be obtained. Our filter medium should be made of "second cut" linters and preferably of grade 7 (Cotton Standards Act of 1926), and additionally we prefer to specify that the linters be thick and stiff. Grade 7 second cut linters comprise approximately 85% cotton linters, 8% staple cotton fibers and the rest immature fibers. While the average length of second cut cotton linters is around 2.4 mm., we prefer to use the "thick, stiff" linters having an average length of approximately 1.5 mm.

The cotton linters pulp that we use in our filter medium has been treated in accordance with conventional processing well known in the industry. Thus, the pulp cotton linters are subjected to a mechanical cleaning operation in which sticks, hull particles, etc., are removed. Thereafter the linters are "digested" by a caustic soda solution treatment under proper conditions of temperature, pressure, time, and caustic concentration. Thereafter, the pulp is washed and then bleached in several stages to reduce the pulp viscosity and remove certain undesirable constituents. After this the pulp is given an acid treatment referred to as the "sour." Then the pulp is refined by jordaning. After this the pulp is fed to a Fourdrinier machine in which it is spread on a moving wire as a water suspension at low consistency. The water drains through the wire and the pulp in sheet form is carried on through pressing rolls and into drying cylinders or equipment. It is very important in the practice of our invention to identify the bottom side of the pulp sheet with respect to the treatment occurring in the Fourdrinier machine. This is known as the "wire" side and is the downstream side with respect to the drainage of water through the thickness of the sheet. It is essential to our invention that the filter medium be "monolithic" in the sense that it is not made up of layers of separate sheets laid face to face but of only a single sheet.

In order to impart some wet strength to the pulp a solution of melamine resin or the equivalent may be sprayed onto preferably both sides of the sheet of pulp during the drying process. The resin is preferably added at a stage where moisture in the pulp sheet is at such a level as to prevent migration through the sheet. This resin is cured during the remainder of the drying cycle, or, in any event, within a relatively short time after the pulp sheet has been formed. It may be noted here that the term "sheet" is intended to include also formation of the pulp into rolls. The resin solids content by weight of dried sheet is approximately 0.75 to 1.0%. This low resin content does not interfere with the desirable characteristics of the pulp, and so far as they are concerned, the pulp is, after such treatment, still considered to be substantially pure alpha cellulose formed from cotton linters. However, this small resin addition does substantially improve the wet strength of the pulp so that it may be expected to withstand in the neighborhood of 7 p.s.i.

While it is difficult to determine exactly what happens to such a small percentage of resin, we believe that it penetrates into the pulp from opposite sides to a limited degree and is absorbed into the structure of the individual cotton linters fibers described above.

In accordance with our invention it is essential to provide an additional resin treatment of the cotton linter pulp sheet. It is essential that this be done only on the wire or downstream side of the sheet and that the penetration be substantially less than the entire thickness of the sheet, preferably about one-half the thickness. We prefer to use a phenol formaldehyde resin emulsion such as a product on the market known as Durez 14170, and we prefer that it meet the following specifications:

| | |
|---|---|
| Specific gravity at 25° C. | 1.208–1.218 |
| Viscosity at 25° C. cp | 150–350 |
| pH | 7.5–8.5 |
| 135° C. solids percent | 64.5–66.5 |
| Water tolerance do | 100–400 |

This resin is sprayed onto the downstream or wire side of the dried sheet so that the content by weight of resin solids added by such treatment is approximately 14% of the weight of the pulp. After the spray treatment with this resin the sheet is semi-dried at approximately 212° F. The sheet is then pleated and the final cure set-up is given at 325–340° F. for a suitable length of time.

With the foregoing treatment the downstream side of the sheet is stiffened considerably but its porosity is not reduced substantially, if at all, because the resin does not harden in the spaces between the linters so that if such spaces constitute the "porosity" of the sheet it remains of substantially uniform porosity through its thickness. However, it is believed that flow resistance of the treated layer is reduced because the resin is all soaked up by the individual linter fibers to minimize flow resisting friction. The impregnated layer comprises linters that are substantially completely saturated and rigidized by the resin so that the flow pattern obtained on the Fourdrinier machine is fixed. This we believe is an optimum pattern of random intermeshed fibers properly oriented in the process of the Fourdrinier machine to give minimum resistance when the "wire" side is the downstream side. On the other hand the untreated, upstream side comprises fully absorbent linters which can in their individual fibril structures absorb water, asphaltenes, and fine contaminants which a totally impregnated fibrous structure cannot separate from the fluid being filtered. Because the untreated layer has fibers that are small and backed up by a rigid layer, the tendency for them to break loose and get into the flow stream is minimized. Because of their uniformity in size the tendency for weak or excessively porous spots to appear is minimized; and because of their flexibility the upstream fibers or the random network thereof can move or give somewhat to plug up weak spots that might appear as well as to permit coarse particles that they cannot absorb to flow by to be trapped by the rigidized downstream layer.

Thus, the invention provides a monolithic filter sheet in which the flow pattern is fixed on the downstream side and somewhat variable on the upstream side with fine filtering by absorption occurring in a first stage in the upstream side and coarser filtering by mechanical straining occurring in a second stage in the treated downstream layer. The impregnated downstream layer (a) fixes an optimum flow path as determined by drainage through the "wire" side on the Fourdrinier machine, (b) provides mechanical straining of contaminants, and (c) furnishes support for the absorbent upstream layer.

We claim:

1. A filter material comprising a monolithic sheet of purified alpha cellulose pulp formed of second cut cotton linters fibers of approximately 2 mm. or less average length and having a wire side as a result of passage through a Fourdrinier machine or the like, the wire side of said sheet being the downstream side during filtration and a downstream layer of approximately one-half the thickness of the sheet impregnated with resin in sufficient quantity to stiffen and rigidize the fibers but not substantially reduce the porosity of said layer as compared with unimpregnated fibers, the remainder of the thickness of the sheet forming the upstream side comprising fibers that are absorbent and retain essentially the characteristics of said pulp, said sheet having a substantially uniform porosity throughout its thickness, the upstream layer comprising an absorbent filter and the downstream layer fixing the flow path through the sheet, furnishing support for the upstream layer, and providing a mechanical strainer.

2. The method of making a filter material which comprises spreading a melamine resin on both sides of a sheet of substantially pure alpha cellulose formed of cotton linters fibers prior to drying of the sheet after it has passed through a Fourdrinier machine, the solid resin content comprising approximately 1% by weight of dried sheet, drying and curing the impregnated sheet, spreading a phenol formaldehyde resin on the wire side only of said sheet in an amount such that it penetrates approximately one-half the thickness of the sheet and such resin solids comprise approximately 14% by weight of the dried sheet.

3. The method set forth in claim 2 including the additional steps of semi-drying the sheet at approximately 212° F., pleating the sheet, and finally curing the sheet at approximately 325–340° F.

4. A filter medium comprising a single thickness monolithic sheet of purified cellulose pulp containing intermingled randomly oriented naturally absorbent fibers, said sheet being of substantially uniform porosity throughout its thickness and having an upstream layer and a downstream layer, said upstream layer being formed of very short, absorbent, and movable fibers that retain essentially the characteristics of said pulp and the individual fibers thereof being capable of absorbing fine contaminant particles and forming an absorbent filter, said downstream layer being approximately one-half the thickness of the sheet and being impregnated with resin so that the fibers thereof are nonabsorbent and rigidized and form a mechanical strainer for straining out relatively coarser contaminant particles and furnish mechanical support for the upstream layer.

References Cited in the file of this patent
UNITED STATES PATENTS

| 437,435 | Howe | Sept. 30, 1890 |
| 2,039,312 | Goldman | May 5, 1936 |

(Other references on following page)

UNITED STATES PATENTS

| | | |
|---|---|---|
| 2,122,111 | Poelman | June 28, 1938 |
| 2,287,161 | Ball | June 23, 1942 |
| 2,600,845 | Carrigan | June 17, 1952 |
| 2,675,127 | Layte | Apr. 13, 1954 |
| 2,782,933 | Monsarrat | Feb. 26, 1957 |
| 2,916,413 | Harpham | Dec. 8, 1959 |

FOREIGN PATENTS

| | | |
|---|---|---|
| 147,397 | Australia | July 18, 1952 |
| 763,782 | Great Britain | Dec. 19, 1956 |

OTHER REFERENCES

Julius Grant: "A Laboratory Handbook of Pulp and Paper Manufacture," Longmans Green & Co., New York, 1942, pages 166, 167, 183, 279, 280, FIGURES 56a and b.